United States Patent [19]

Motoki et al.

[11] Patent Number: 5,049,284

[45] Date of Patent: Sep. 17, 1991

[54] METHOD OF REMOVING RADIOACTIVE EUROPIUM FROM SOLUTIONS OF RADIOACTIVE GADOLINIUM

[75] Inventors: Ryozo Motoki; Kusuo Terunuma, both of Ibaraki, Japan

[73] Assignee: Japan Atomic Energy Research Institute, Tokyo, Japan

[21] Appl. No.: 415,502

[22] Filed: Oct. 2, 1989

[30] Foreign Application Priority Data

Oct. 7, 1988 [JP] Japan ............................ 63-253286

[51] Int. Cl.[5] ........................................ B01D 15/00

[52] U.S. Cl. ............................ 210/682; 210/719; 210/757; 210/209; 210/263; 423/2; 423/6

[58] Field of Search ............... 252/631, 626; 210/682, 210/683, 684, 717, 626, 209, 757, 719, 263; 423/2, 22, 6, 7

[56] References Cited

U.S. PATENT DOCUMENTS 4,622,176 11/1986 Motoki et al. .................... 210/682

FOREIGN PATENT DOCUMENTS 8512018 8/1985 France .
166469 9/1985 Japan .

OTHER PUBLICATIONS

IAEA/WMRA/13-81/11, "Removal of Ru-106 with zinc-charcoal column", H. Nakamura, R. Motoki, T. Sato, et al.

Radiochimica Acta 48, "Chemical Species of Ruthenium in Radioactive Aqueous and Decontamination Mechanism of Ruthenium with Zinc-Charcoal Mixed Column", pp. 101-113, Tadashi Sato and Ryozou Motoki.

JAERI-M 86-077 (May 1986) (Abstract).

JAERI-M 84-153 (Sep. 1984) (Abstract).

JAERI-M 84-015 (Feb. 1984) (Abstract).

Jaeri-M 83-197 (Nov. 1983) (Abstract).

"Galolinium-153 Production at the Oak Ridge National Laboratory", by D. W. Ramey, Conf-870822-6, DE87 013678 (1987).

"The Application of Electroreduction of Europium in the Production of Gadolinium-153", by T. C. Quinby, et al., ORNL/RM-10284, DE87 005281.

"Use of High-Pressure Ion Exchange for the Production of Gadolinium 153, Status Report", by J. C. Posey, ORNL/TM-9988, DE86 010062 (1986).

"Selective Electroreduction of Europium in the Production of Gadolinium-153", by T. C. Quinby, et al., Radiochimica Acta 43, pp. 161-165, (1988).

"Radioactive Ruthenium Removal From Liquid Wastes of 99Mo Production Process Using Zinc and Charcoal Mixture", by R. Motoki, et al., pp. 63-73 IAEA-TECDOC-337 (1985).

*Primary Examiner*—Stanley S. Silverman
*Assistant Examiner*—Cynthia L. Nessler
*Attorney, Agent, or Firm*—Banner, Birch, McKie & Beckett

[57] ABSTRACT

The improved method and apparatus are capable of efficient removal of radioactive europium from solutions of radioactive gadolinium in a simple way. A mixture of a zinc and a graphite powder is packed into a column and both a conditioning solution corresponding to a liquid electrolyte and a sample solution containing radioactive gadolinium and europium are allowed to pass through the column.

2 Claims, 1 Drawing Sheet

METHOD OF REMOVING RADIOACTIVE EUROPIUM FROM SOLUTIONS OF RADIOACTIVE GADOLINIUM

BACKGROUND OF THE INVENTION

Field of the Invention

The present invention relates to a method of producing radioisotopes used in the field of nuclear medicine, in particular, to a method of removing radioactive europium from solutions of radioactive gadolinium.

Description of Background Information

Radioactive gadolinium (hereinafter abbreviated as $^{153}Gd$) is used as a source of radiation in the field of nuclear medicine for the specific purpose of diagnosing osteoporosis and is commonly produced by irradiating europium with neutrons in nuclear reactors. The produced $^{153}Gd$ is chemically separated from other radioactive nuclear species such as $^{152}Eu$, $^{154}Eu$ and $^{156}Eu$ which occur simultaneously during irradiation with neutrons.

Diagnosis of osteoporosis makes use of the phenomenon that two photons having different energies of 44 keV and 100 keV are liberated from $^{153}Gd$. Since $^{153}Gd$ used for this purpose is desirably free of other radioactive nuclear species, it must be purified to a level of at least 99.999%. The method currently practiced at the Oak Ridge National Laboratory to purify gadolinium consists of the following steps: dissolving neutron-irradiated europium in sulfuric acid; reducing the concentration of Eu to about 5.5 mg/ml; reducing $Eu^{3+}$ to $Eu^{2+}$ by electrolytic reduction; preliminarily separating the radioactive europium by filtration to a decontamination factor of 100; and finely separating the same by means of a cation-exchange resin column. Separation could be accomplished by using a cation-exchange resin alone but when handling a large volume of radioactive europium, the ion-exchange capacity of the resin will decrease by radiation injury. It is therefore necessary to perform preliminary separation of radioactive europium. Thus, in the case of handling radioactive europium in a large volume, the conventional practice has required the adoption of two steps, one being preliminary separation of radioactive europium by electrolytic reduction and the other being purification on a cation-exchange resin column. The decontamination factor of radioactive europium as attained by electrolytic reduction, namely, the ratio of the initial concentration of europium to the europium level after preliminary separation, depends on the solubilities of $Eu^{3+}$ and $Eu^{2+}$ and would theoretically reach a maximum value at the ratio of the solubility of $Eu^{3+}$ to that of $Eu^{2+}$, which is estimated to be approximately 200. The Oak Ridge method of electrolytic reduction for preliminary separation employs an apparatus that is chiefly composed of an electrolytic cell with zinc electrodes, a constant current supply unit and a polarity changing unit. The radioactive europium preliminarily separated with this apparatus is subsequently subjected to further purification with a cation-exchange resin. FIG. 1 is a schematic representation of this apparatus of electrolytic reduction.

SUMMARY OF THE INVENTION

An object of the present invention is to provide a method capable of efficient removal of radioactive europium from solutions of radioactive gadolinium in a simple way without requiring two steps as in the prior art.

Another object of the present invention is to provide an apparatus which is simple and which yet is capable of efficient removal of radioactive europium from solutions of radioactive gadolinium.

In order to attain these objects, a column is packed with a mixture of zinc and graphite powders (the column is hereinafter referred to as a zinc/graphite powder column), and both a conditioning solution corresponding to a liquid electrolyte and a solution containing radioactive gadolinium and europium are passed through said zinc/graphite powder column.

The combination of zinc and graphite is that of cell materials and provides, in the presence of a strong acidic liquid electrolyte, a strong reducing atmosphere capable of reducing $Eu^{3+}$ to $Eu^{2+}$. Hence, the heart of the present invention is that it makes use of Volta's series.

DESCRIPTION OF THE PREFERRED EMBODIMENTS

Figure 1:
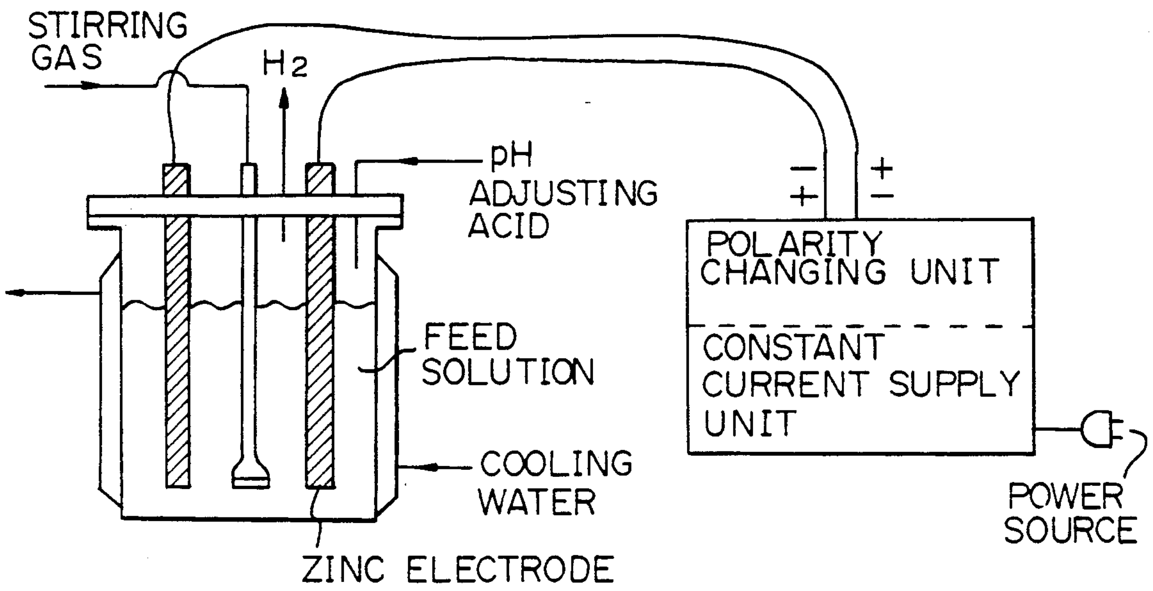
Fig. 1 PRIOR ART
FIG. 1 is a sketch of the apparatus of electrolytic reduction used in a prior art method of removing radioactive europium from solutions of radioactive gadolinium.
Figure 2:
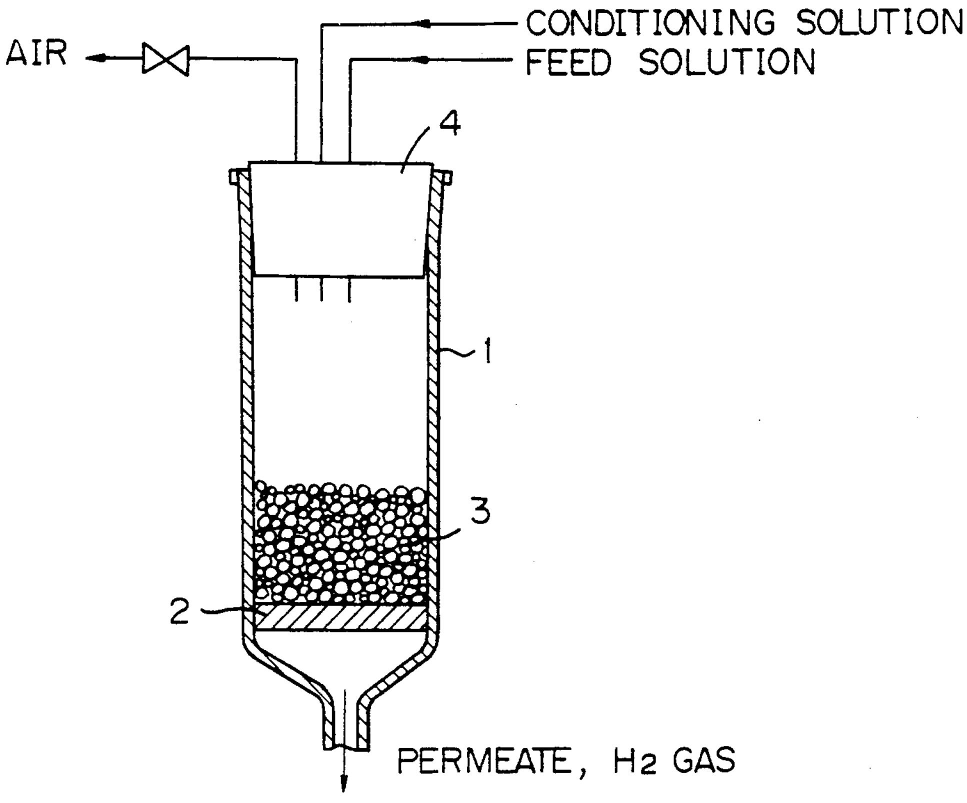
FIG. 2 is a cross section of an apparatus that may be used to implement the method of the present invention.

The apparatus shown in FIG. 2 consists basically of a glass column 1, a G2 glass filter 2, a mixture 3 of a zinc and a graphite powder, and a cover 4. In measuring the ability of the zinc/graphite powder column to remove radioactive europium and the yield of $^{153}Gd$ that could be recovered, tracers of $^{152}Eu$ and $^{153}Gd$ were used. The column had an inside diameter of 40 mm. The zinc powder packed into the column had a particle size no coarser than 100 mesh, and the graphite powder also packed into the column was an artificial one having a particle size of 100–200 mesh.

The following examples are provided for the purpose of further illustrating the present invention but are in no way to be taken as limiting.

EXAMPLE 1

A zinc and a graphite powder each weighing 40 g were mixed in water containing a small amount of ethyl alcohol and the resulting mixture was packed into a column to provide a bed volume of about 56 $cm^3$. The column was conditioned by passage of $H_2O$ (100 ml) and 0.1N $H_2SO_4$ (100 ml). Thereafter, 300 ml of a feed solution of Gd containing Eu (for its concentration, see Table 1 below) and 100 ml of 0.1N $H_2SO_4$ as a column washing solution were passed through the column to evaluate the efficiency of Eu removal. The purified product of Gd was recovered from the bottom of the column.

The results are shown in Tables 2–4, in which the efficiency of Eu removal is indicated by Co/C (Co is the concentration of $^{152}Eu$ in the feed solution, and C is the concentration of $^{152}Eu$ in the permeate). The recovery yield (%) of $^{153}Gd$ is expressed by $C/Co \times 100$ (where C is the concentration of $^{153}Gd$ in the permeate and Co is the concentration of $^{153}Gd$ in the feed solution). Evaluation of the performance for the total volume of passage (400 ml) was based on the total radioactivity level.

TABLE 1

Characteristics of Feed Solutions

| Example | Eu concentration (mg/ml) | Gd concentration (mg/ml) | $^{152}Eu$ concentration (μCi/ml) | $^{153}Gd$ concentration (μCi/ml) | pH |
|---|---|---|---|---|---|
| 1-1 | 2.88 | 0.13 | $2.0 \times 10^{-2}$ | $1.3 \times 10^{-2}$ | 1.35 |
| 1-2 | 0.21 | 0.13 | $1.0 \times 10^{-2}$ | $6.7 \times 10^{-3}$ | 1.35 |
| 1-3 | 0.056 | 0.13 | $1.0 \times 10^{-2}$ | $6.7 \times 10^{-3}$ | 1.35 |

The feed solutions rendered strongly acidic with sulfuric acid were passed through the column at flow rates of 3.5-5 ml/min and after every passage of a predetermined amount, 1-ml portions were sampled and their radioactivity levels were compared.

TABLE 2

Results of Example 1-1

| Volume of passage (ml) | | Co/C of $^{152}Eu$ | Recovery yield of $^{153}Gd$ (%) |
|---|---|---|---|
| Feed solution | 50 | 82 | 80 |
| | 125 | 136 | 92 |
| | 180 | 327 | 94 |
| | 240 | 258 | 95 |
| | 300 | 166 | 94 |
| Wash solution | 25 | 343 | 72 |
| | 60 | 1300 | 2 |
| | 100 | 1030 | 0.3 |
| Total volume | 400 | 126 | 91 |

TABLE 3

Results of Example 1-2

| Volume of passage (ml) | | Co/C of $^{152}Eu$ | Recovery yield of $^{153}Gd$ (%) |
|---|---|---|---|
| Feed solution | 50 | 2.9 | 55 |
| | 100 | 11.8 | 91 |
| | 150 | 14.1 | 93 |
| | 200 | 23.8 | 88 |
| | 250 | 33.9 | 90 |
| | 300 | 52.9 | 88 |
| Wash solution | 50 | 54.9 | 38 |
| | 100 | 86.7 | 2 |
| Total volume | 400 | 10.4 | 93 |

TABLE 4

Results of Example 1-3

| Volume of passage (ml) | | Co/C of $^{152}Eu$ | Recovery yield of $^{153}Gd$ (%) |
|---|---|---|---|
| Feed solution | 50 | 1.3 | 53 |
| | 100 | 1.3 | 92 |
| | 150 | 1.8 | 93 |
| | 200 | 2.1 | 93 |
| | 250 | 3.0 | 95 |
| | 300 | 4.1 | 94 |
| Wash solution | 50 | 16.3 | 23 |
| | 100 | 29.0 | 1 |
| Total volume | 400 | 2.0 | 88 |

As is clear from Tables 2-4, the zinc/graphite powder column method of the present invention is capable of recovering gadolinium in very high yield (88-93%), with europium being reduced to $Eu^{+2}$ in the column. The removal efficiency of this method depends on the concentration of europium in the feed solution, which must be increased if high removal efficiency is desired. At a europium concentration of 2.88 mg/ml, the level of radioactive europium could be reduced to about a hundredth of the initial value. This dependency of the efficiency of europium removal on its concentration would result from the difference in solubility between $Eu^{3+}$ and $Eu^{2+}$. Hence, the decontamination factor of radioactive europium that can be attained by the zinc/graphite powder column method provides a maximum value comparable to that achieved by the electrolytic reduction method.

In Examples 1-2 and 1-3, the Co/C value of $^{152}Eu$ increased with the increase in the volume of feed solution passed. This would be because the efficiency of europium removal was improved by the increase in the amount of $Eu^{2+}$ retained in the zinc/graphite powder column. This suggests the possibility that a higher efficiency of removal can be attained if a solution containing radioactive europium and gadolinium is passed through the column after the latter has been conditioned to have $Eu^{2+}$ retained in it. A method that adopts this approach is illustrated in the following Example 2.

EXAMPLE 2

The $Eu^{3+}$ solution used to condition the column had the characteristics shown in Table 5. Table 6 shows the characteristics of the feed solutions passed through the conditioned column. The feed solutions were passed through the zinc/graphite powder column as in Example 1 and after every passage of a predetermined volume, 2-ml portions of the effluent were sampled and the changes in the concentrations of $^{152}Eu$ and $^{153}Gd$ were measured. The results are shown in Tables 7-9.

In Example 2-3, nitric acid solutions which were believed to have a greater ability to dissolve $Eu^{3-}$ than sulfuric acid solutions were used as feed solutions, and the column was washed with 0.1N nitric acid. The other experimental conditions for Examples 2-1 to 2-3 including flow rate were the same as in Example 1.

TABLE 5

Conditioning Solution

| Example | Solution and its volume (ml) | Concentration of $Eu^{3+}$ (mg/ml) | Amount of $Eu^{2+}$ retained (g) |
|---|---|---|---|
| 2-1 | 0.1 N.$H_2SO_4$ 100 | 5.1 | 0.5 |
| 2-2 | 0.1 N.$H_2SO_4$ 400 | 6.5 | 2.6 |
| 2-3 | 0.1 N.$H_2SO_4$ 400 | 5.2 | 2.1 |

TABLE 6

Characteristics of Feed Solutions

| Example | Eu concentration (mg/ml) | Gd concentration (mg/ml) | $^{152}Eu$ concentration (μCi/ml) | $^{153}Gd$ concentration (μCi/ml) | pH |
|---|---|---|---|---|---|
| 2-1 | 3.1 | 0.15 | $2 \times 10^{-2}$ | $1 \times 10^{-1}$ | 1.4 |
| 2-3 | 2.9 | 0.18 | $6 \times 10^{-2}$ | $1 \times 10^{-1}$ | 1.4 |
| 2-3 | 7.2 | 0.11 | $3 \times 10^{-2}$ | $1 \times 10^{-1}$ | 1.2 |

TABLE 7

Results of Example 2-1

| Volume of passage (ml) | | Co/C of $^{152}Eu$ | Recovery yield of $^{153}Gd$ (%) |
|---|---|---|---|
| Feed solution | 50 | 190 | 84 |
| | 100 | 187 | 96 |
| | 150 | 127 | 100 |
| | 200 | 167 | 100 |
| | 250 | 201 | 100 |
| | 300 | 168 | 100 |
| Wash solution | 50 | 325 | 4 |

TABLE 7-continued

| Results of Example 2-1 | | | |
|---|---|---|---|
| Volume of passage (ml) | | Co/C of $^{152}$Eu | Recovery yield of $^{153}$Gd (%) |
| | 100 | 316 | 0 |
| Total volume | 400 | 192 | 96 |

TABLE 8

| Results of Example 2-2 | | | |
|---|---|---|---|
| Volume of passage (ml) | | Co/C of $^{152}$Eu | Recovery yield of $^{153}$Gd (%) |
| Feed solution | 50 | 458 | 92 |
| | 100 | 356 | 100 |
| | 150 | 350 | 100 |
| | 200 | 390 | 100 |
| | 250 | 350 | 100 |
| | 300 | 271 | 100 |
| Wash solution | 50 | 5890 | 4 |
| | 100 | 1960 | 1 |
| Total volume | 400 | 350 | 94 |

TABLE 9

| Results of Example 2-3 | | | |
|---|---|---|---|
| Volume of passage (ml) | | Co/C of $^{152}$Eu | Recovery yield of $^{153}$Gd (%) |
| Feed solution | 50 | 1300 | 87 |
| | 100 | 920 | 92 |
| | 150 | 710 | 91 |
| | 200 | 520 | 90 |
| | 250 | 830 | 88 |
| | 300 | 740 | 90 |
| Wash solution | 50 | 1700 | 5 |
| | 100 | 8800 | 2 |
| Total volume | 400 | 520 | 85 |

In Example 1-1, no preliminary treatment was conducted to have $Eu^{2+}$ retained in the column. Comparing the results of Example 1-1 with those of Examples 2-1 and 2-2, one can readily see that the Co/C value for the total volume of 400 ml was improved from 126 to 192 and even to 350. Obviously, the ability of the column to remove radioactive europium was improved with the increase in the amount of $Eu^{2+}$ retained. The Co/C level was significantly improved to 520 with the nitric acid solution containing $Eu^{3+}$ at the concentration of 7.2 mg/ml.

As described on the foregoing pages, the method of the present invention for removing radioactive europium is improved over the prior art practice in that it is capable of removing radioactive europium from solutions of radioactive gadolinium with greater ease and rapidity but without suffering any significant drop in the recovery yield of radioactive gadolinium. Another advantage of the method is that it attains a higher decontamination factor by merely packing a column with a mixture of a zinc and a graphite powder and then allowing both a conditioning solution containing $Eu^{3+}$ (corresponding to a liquid electrolyte) and a feed solution (to be preliminarily separated) to pass through the column. The method can be operated with a simpler apparatus than in the conventional electrolytic reduction method. The economic advantage of the apparatus is further improved by the fact that it does not have to include a $Eu^{2+}$ filtration unit.

The heart of the present invention lies in the use of Volta's series and aside from the combination of zinc and graphite used in the Examples, various other combination of materials in Volta's series are applicable as long as they create a strong enough reducing atmosphere to convert $Eu^{3+}$ to $Eu^{2+}$. Further, the method of the present invention is applicable to pulification of other material in which a reducing action is required.

While the present invention has been described above with reference to particularly preferred embodiments, it should be noted that these are not the sole examples of the present invention and one skilled in the art will readily understand that various modifications and improvements can be made without departing from the spirit and scope of the present invention.

What is claimed is:

1. A method of removing radioactive europium from a solution of radioactive gadolinium, which method comprises:

(a) packing a mixture of a zinc and a graphite powder into a column;

(b) acidifying a feed solution containing radioactive gadolinium and radioactive europium with sulfuric acid, wherein said europium comprises $Eu^{3+}$, (c) passing said acidified solution and an electrolytic $Eu^{3+}$ containing conditioning solution through the column, wherein the reducing action created in the column reduces $Eu^{3+}$ to $Eu^{2+}$; and, (d) removing said radioactive europium from said solution of radioactive gadolinium by retaining $Eu^{2+}$ in said column.

2. An apparatus for removing radioactive europium from a solution of radioactive gadolinium, which apparatus comprises:

a column packed with a mixture of a zinc and a graphite powder, wherein said column contains both a feed solution, rendered acidic with sulfuric acid, containing radioactive gadolinium and radioactive europium, wherein said europium comprises $Eu^{3+}$, and an electrolytic $Eu^{3+}$ containing conditioning solution, and the reducing action created in said column being used to reduce $Eu^{3+}$ to $Eu^{2+}$ as the supplied solutions pass through the column.

* * * * *